United States Patent
Steffes

[19]
[11] Patent Number: 6,142,583
[45] Date of Patent: Nov. 7, 2000

[54] ANTI-LOCKING HYDRAULIC MOTOR VEHICLE BRAKE SYSTEM

[75] Inventor: Helmut Steffes, Hattersheim, Germany

[73] Assignee: Continental Teves AG & CO. OHG, Germany

[21] Appl. No.: 09/155,145

[22] PCT Filed: Mar. 27, 1997

[86] PCT No.: PCT/EP97/01577
§ 371 Date: Feb. 22, 1999
§ 102(e) Date: Feb. 22, 1999

[87] PCT Pub. No.: WO97/37879
PCT Pub. Date: Oct. 16, 1997

[30] Foreign Application Priority Data

Apr. 6, 1996 [DE] Germany ............ 196 13 903

[51] Int. Cl.[7] ................ B60T 8/44
[52] U.S. Cl. ................ 303/114.1; 303/113.4
[58] Field of Search ............ 303/114.1, 114.3, 303/115.1, 115.3, 115.4, 113.3, DIG. 11, 64, 11, 10, 87, 900, 116.1, 116.2, 116.4

[56] References Cited

U.S. PATENT DOCUMENTS

| | | | |
|---|---|---|---|
| 5,236,256 | 8/1993 | Schmidt et al. | 303/113.2 |
| 5,281,014 | 1/1994 | Voltz | 303/116.1 |
| 5,445,444 | 8/1995 | Rump et al. | 303/125 |
| 5,735,314 | 4/1998 | Alaze et al. | 138/31 |
| 5,803,555 | 9/1998 | Schaefer | 303/87 |
| 5,816,667 | 10/1998 | Jokic | 303/113.4 |
| 5,853,229 | 12/1998 | Willman et al. | 303/3 |
| 5,902,020 | 5/1999 | Drott | 303/122.09 |
| 5,918,948 | 7/1999 | Burgdorf et al. | 303/113.2 |

FOREIGN PATENT DOCUMENTS

| | | |
|---|---|---|
| 3413626 | 10/1985 | Germany . |
| 3607366 | 9/1987 | Germany . |
| 4106336 | 9/1992 | Germany . |
| 4201732 | 7/1993 | Germany . |
| 4425578 | 1/1996 | Germany . |
| WO 95/11824 | 5/1995 | WIPO . |

*Primary Examiner*—Christopher P. Schwartz
*Assistant Examiner*—Melanie Talavera
*Attorney, Agent, or Firm*—Rader, Fishman & Grauer PLLC

[57] ABSTRACT

The present invention relates to an anti-lock hydraulic automotive brake system which includes a pneumatic brake force booster (6) operable in response to the driver and independently therefrom, and a master brake cylinder (8) connected downstream of the brake force booster (6) and having pressure chambers to which several wheel brakes (HR, HL, VR, VL) associated with the vehicle wheels are connected by way of an ABS hydraulic unit (11) with a pump (7). Means (1, 2, 3, 4, 5) are provided which sense the actution of the brake force booster (6), control the pump (7) and constitute a hydraulic connection between the master brake cylinder (8) and the suction side of the pump (7).

8 Claims, 1 Drawing Sheet

ANTI-LOCKING HYDRAULIC MOTOR VEHICLE BRAKE SYSTEM

BACKGROUND OF THE INVENTION

The present invention relates to an anti-lock hydraulic automotive brake system.

German patent application 44 25 578 discloses an anti-lock automotive brake system wherein a pneumatic brake force booster which is operable irrespective of the driver's pedal actuation and a master brake cylinder connected downstream of the brake power booster are connected to an ABS hydraulic unit which has a pump and to which the individual wheel brakes of the vehicle wheels are connected. Upon the entry into brake pressure control, the brake force booster is actuated independently of the driver in order to precharge the wheel brakes, and further pressure increase in the wheel brakes is effected by means of the pump upon completion of the precharging operation.

The known brake force booster has a complicated construction and requires corresponding electrical actuating provisions for the actuation of the control part in the brake force booster by independent force.

An object of the present invention is to improve an anti-lock automotive brake system of the type mentioned hereinabove to such end that the pump can be precharged quickly by applying relatively simple means.

SUMMARY OF THE INVENTION

According to the present invention, this object is achieved by inserting a hydraulic connection including a multi-way valve between the master brake cylinder and the suction side of the pump and by providing a pressure dampening diaphragm between the multi-way valve and the suction side of the pump.

Further features, advantages and possible applications of the present invention can be seen hereinbelow in the description of an embodiment.

BRIEF DESCRIPTION OF THE DRAWING

The only

DETAILED DESCRIPTION OF THE DRAWING

Figure 1:
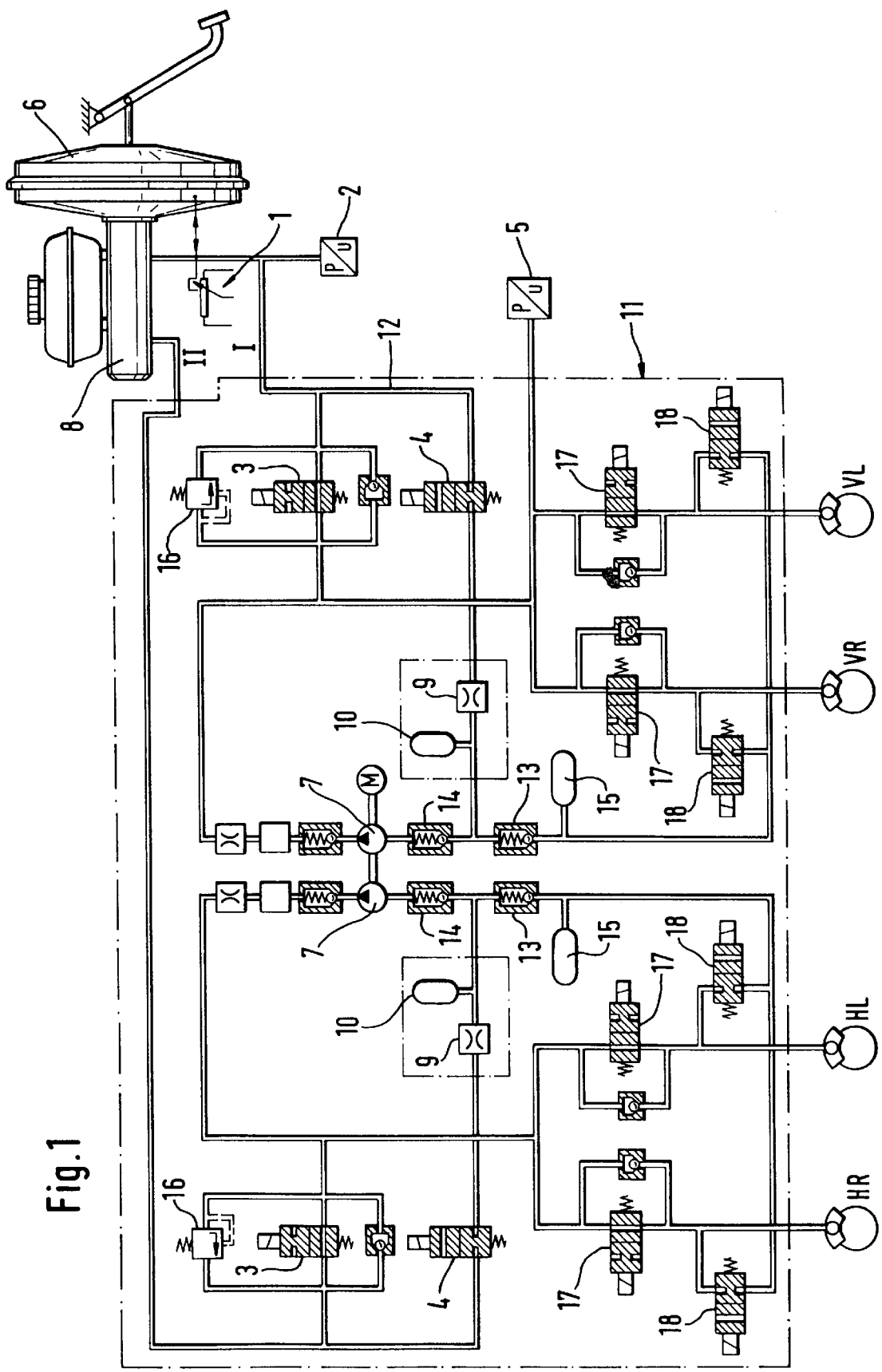
FIG. 1 shows in a schematic view the circuit-related design of a dual-circuit anti-lock automotive brake system.

The brake system includes a pneumatic brake force booster 6 which is operable exclusively in response to driver pedal application. Flanged to booster 6 is a master brake cylinder 8 having pressure chambers to which several wheel brakes HR, HL, VR, VL associated with the vehicle wheels are connected by way of an ABS hydraulic unit 11 including a pump 7. According to the present invention, means 1, 2, 3, 4, 5 are provided which sense the actuation of the brake force booster 6, control the pump 7 and constitute a hydraulic connection between the master brake cylinder 8 and the suction side of the pump 7. The pedal travel or diaphragm travel is registered by a travel sensor 1 to record the actuation of the brake force booster 6. Another means in the hydraulic connection between the master brake cylinder 8 and the suction side of the pump 7 is a multi-way valve 4 closed in its initial position. Valve 4 is inserted in a line branch 12 connected between an inlet valve 3 and the master brake cylinder 8 to the hydraulic connection which leads to the wheel brakes HR, VR, HL, VL. The pressure side of the pump 7 is isolated from the master brake cylinder 8 by the inlet valve 3 in the open position of the multi-way valve 4. Besides, a pressure sensor 2 which senses the pressure in the master brake cylinder 8 in dependence on pedal application is arranged at a pressure port of the master brake cylinder 8. Mounted on the pressure side of the pump 7 is another pressure sensor 5 which is connected along with the pressure sensor 2 on the master brake cylinder 8 to an electronic comparator of an evaluating unit. Thus, the supply pressure or the supply rate of the pump 7 can favorably be influenced as a function of the signals of the two pressure sensors 2, 5 which are evaluated in the comparator. To dampen the pulsation of the pump 7 in the direction of the master brake cylinder 8, a diaphragm 9 and a pressure fluid accumulator 10 are inserted into the hydraulic connection between the multi-way valve 4, that is closed in its inactive position, and the suction side of the pump 7. Further, electromagnetic pressure control valves 17, 18 which connect the wheel brakes HR, HL, VR, VL either to the master brake cylinder 8 or to the suction side of the double-suction pump 7 are interposed in front of the wheel brakes HR, HL, VR, VL downstream of each inlet valve 3 in the two brake circuits I, II. Upstream and downstream of the hydraulic connection of the multi-way valve 4 to the suction side of the pump 7, there are non-return valves 13, 14 in the suction line of the pump 7 which open in the direction of the pump 7. Excessive pressure fluid volume discharged from the wheel brakes HR, HL, VR, VL can be stored in a low-pressure accumulator 15 and, when needed, supplied to the pressure circuit of the pump 7. A pressure-relief valve 16 connected to the pressure side of the pump 7 limits the allowable system pressure in the system.

The operation of the brake system will be explained in the following. The valve positions illustrated in FIG. 1 initially refer to the brake release position and wheel-slip-free normal braking position. When the brake pedal is applied, the pressure fluid in the master brake cylinder 8 is conducted to the open pressure control valves 17 and, thus, to the wheel brakes HR, HL, VR, VL by way of the open inlet valve 3 of each brake circuit I, II which is not energized electromagnetically. Initially, the multi-way valve 4 remains electromagnetically unexcited in its closed position. Also, the pressure control valves 18 acting as outlet valves remain electromagnetically unexcited in their closed position, with the result that the suction side of the pump 7 is unpressurized. When inadmissible wheel slip signals are identified by way of an evaluating electronics (not shown), the signal of the travel sensor 1 representative of the actuation of the brake force booster 6 causes electric activation of the pump 7 and hydraulically connects the suction side of the pump 7 to the pressure chambers of the master brake cylinder 8 by way of the multi-way valve 4 which is switched electromagnetically to adopt its open position. Additionally, the inlet valve 3 of each brake circuit I, II assumes its closed position, with the result that the pressure side of the pump 7 is uncoupled from the brake lines that lead to the master brake cylinder 8 and delivers the pressure fluid exclusively in the direction of the wheel brakes HR, HL, VR, VL. Upon continued pedal application, the pump 7 is precharged proportionally to pedal force because the suction side of the pump is now connected to the master brake cylinder 8. Pump 7 makes the pressure fluid adopt a higher pressure level which is now conducted to the wheel brake cylinders HR, HL, VR, VL. By way of the pressure sensor 2 sensing the master brake cylinder pressure and the pressure sensor 5 sensing the pump pressure, the pump output can be varied as required by comparing both pressure signals in an evaluating unit (not shown). Upon an imminent locked condition of a vehicle wheel, pressure fluid volume is discharged from the wheel brakes (as is generally known) by way of the pressure control valves 18 acting as outlet valves and respectively supplied to the low-pressure accumulator 15. This pressure fluid volume must be discharged from the low-pressure accumulator 15 by the pump 7. For this purpose, the multi-way valve 4 will switch to its closed position again in the pressure reduction period of anti-lock pressure control until the low-pressure accumulator 15 has been emptied. Pump pulsations have almost no reactions to the pedal due to the arrangement of the pressure fluid accumulator 10 and the diaphragm 9 although a stiff pressure fluid column is compressed between the suction side of the pump 7 and the master brake cylinder 8 during the precharging operation generated by pedal force. Thus, the brake system disclosed permits achieving an adjustment of the braking pressure in the wheel cylinders by way of the quantity of pressure fluid supplied by the pedal to the pump 7. Resetting of the pedal by the driver is identified by the travel sensor 1 and the pressure sensor 2, the pump 7 is deactivated and the supply valve 3 and the multi-way valve 4 are switched to their initial position according to the drawing. When the pressure sensor 2 is provided with a considerably finer measurment range at low brake pressures (response behavior), the travel sensor 1 may be omitted.

List of Reference Numerals:

1 travel sensor
2 pressure sensor
3 inlet valve
4 multi-way valve
5 pressure sensor
6 brake force booster
7 pump
8 master brake cylinder
9 diaphragm
10 pressure fluid accumulator
11 hydraulic unit
12 line branch
13 non-return valve
14 non-return valve
15 low-pressure accumulator
16 pressure-relief valve
17 pressure control valve
18 pressure control valve
I,II brake circuit

What is claimed is:

1. An anti-lock hydraulic automotive brake system comprising:

a pneumatic brake force booster operable in response to a driver;

a master brake cylinder connected to the brake force booster and having pressure chambers to which several wheel brakes associated with vehicle wheels are connected by way of a brake line and an ABS hydraulic unit including a pump with a suction side and a pressure side;

a pressure sensor that senses the pressure developed by the master brake cylinder;

a multi-way valve constituting a hydraulic connection between the master brake cylinder and the suction side of the pump;

a diaphragm connected to said hydraulic connection, interposed between the multi-way valve and the suction side of the pump; and a pressure sensor positioned on the pressure side of the pump.

2. The brake system as claimed in claim 1, including a travel sensor which detects the pedal travel and records the actuation of the brake force booster and also triggers the pump.

3. The brake system as claimed in claim 1, wherein the multi-way valve has an initial closed position and an open position and is inserted into a line branch that is connected to the brake line.

4. The brake system as claimed in claim 3, wherein the pressure side of the pump is separable from the master brake cylinder when the multi-way valve is in its open position.

5. The brake system as claimed in claim 1, wherein the pressure sensor which senses the pressure developed by the master brake cylinder is positioned on a pressure port of the master brake cylinder.

6. The brake system as claimed in claim 5, wherein both pressure sensors are connected to an electronic comparator of an evaluating unit.

7. The brake system as claimed in claim 6, wherein the supply pressure of the pump is adjustable as a function of the signals of both pressure sensors evaluated in the comparator.

8. The brake system as claimed in claim 1, wherein the diaphragm in the hydraulic connection is arranged in combination with a pressure fluid accumulator in order to dampen pulsation of the pump.

* * * * *